United States Patent [19]

Hamano

[11] 3,863,535

[45] Feb. 4, 1975

[54] ROTARY SHEARING MACHINE

[76] Inventor: Masai Hamano, 44-1, Takinogawa 6-chome, Kita-ku, Tokyo, Japan

[22] Filed: Feb. 5, 1974

[21] Appl. No.: 439,833

[30] Foreign Application Priority Data
Feb. 6, 1973 Japan................................ 48-16008
Dec. 18, 1973 Japan.............................. 48-143614

[52] U.S. Cl. ................................................ 83/196
[51] Int. Cl............................................... B26d 1/00
[58] Field of Search ............ 83/196, 198, 178, 186, 83/189, 199

[56] References Cited
UNITED STATES PATENTS
2,435,469  2/1948  Roop .................................... 83/186
3,750,505  8/1973  Organ et al. ...................... 83/189 X FOREIGN PATENTS OR APPLICATIONS
781,897  8/1957  Great Britain......................... 83/196

Primary Examiner—Willie G. Abercrombie
Attorney, Agent, or Firm—Steinberg & Blake

[57] ABSTRACT

A rotary shearing machine for shearing workpieces such as bars, rods, or the like. A stationary shearing tool is formed with an opening for receiving part of a workpiece during shearing thereof with this opening extending along a given axis. The stationary shearing tool has at one end a shearing edge which surrounds the latter axis. A rotary shearing tool is located next to the stationary shearing tool and also is formed with an opening for receiving part of a workpiece during shearing thereof, this rotary shearing tool having a rest position where the axis of its opening coincides substantially with the above given axis. Next to the stationary shearing edge the rotary shearing tool has a rotary shearing edge which surrounds the given axis when the rotary shearing tool is in its rest position. A structure supports the rotary shearing tool for rotation about the above given axis while simultaneously displacing the rotary shearing tool transversely of the latter given axis so that due to this combined rotary and translational movement of the rotary shearing tool the eccentricity of the latter increases with respect to the given axis and the stationary and rotary shearing edges shear the workpiece.

15 Claims, 9 Drawing Figures

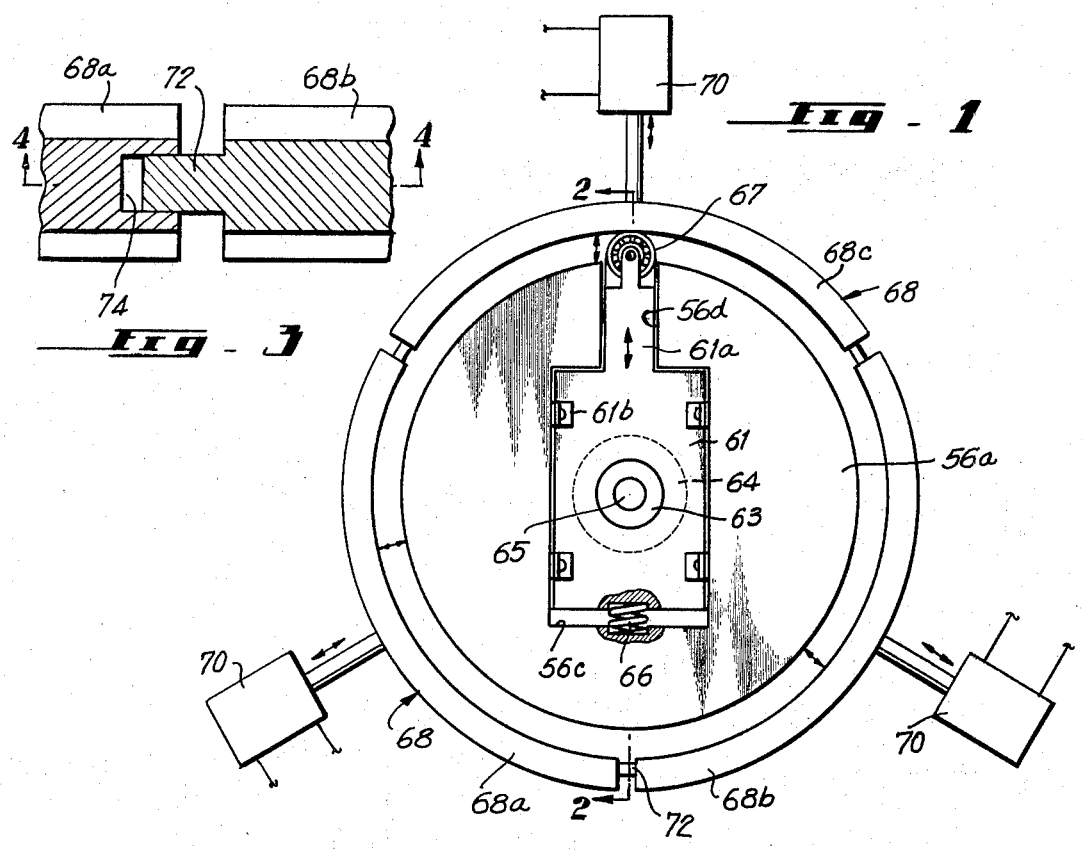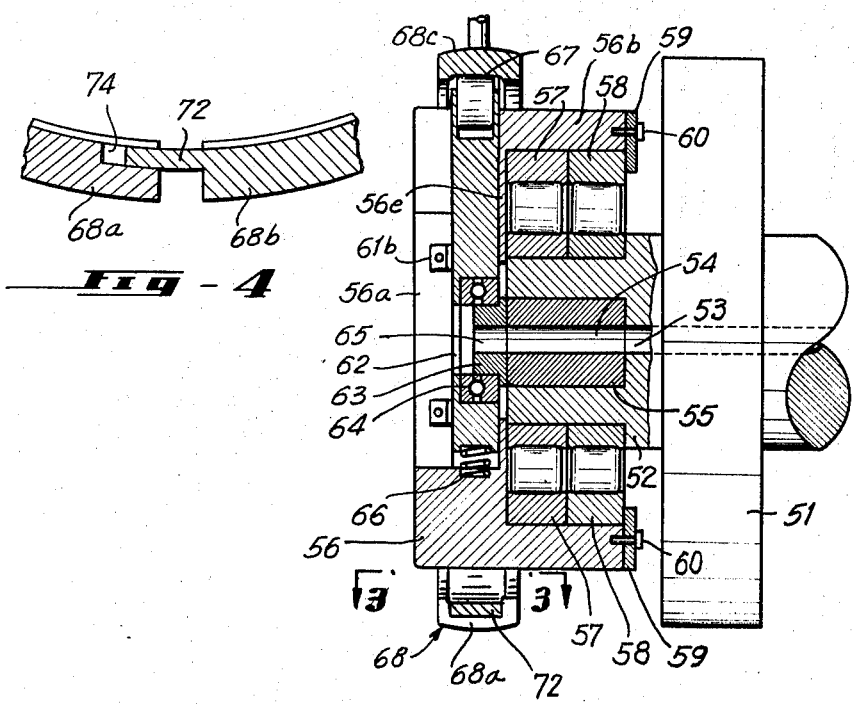

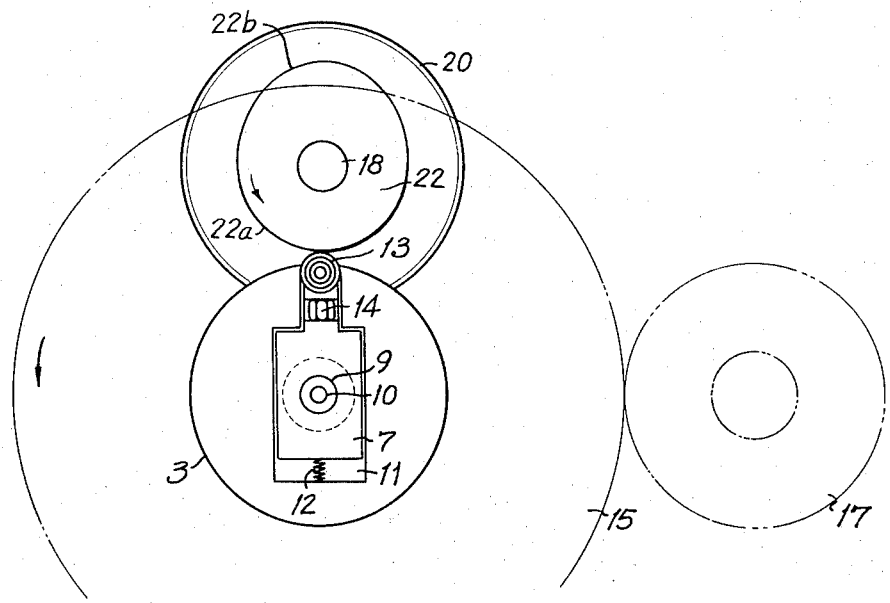
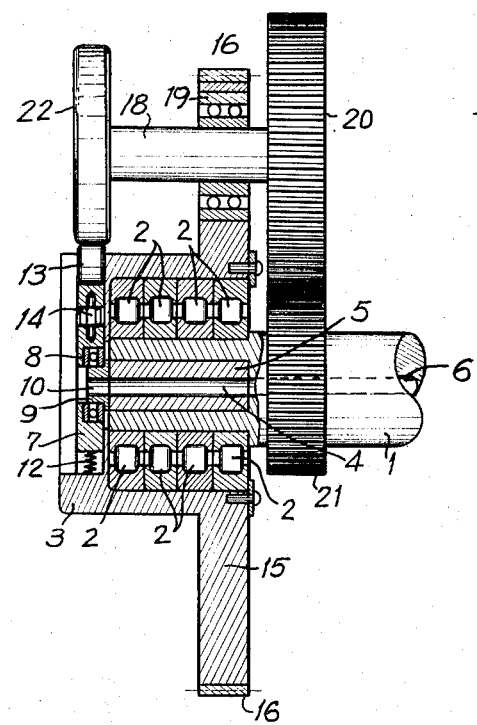

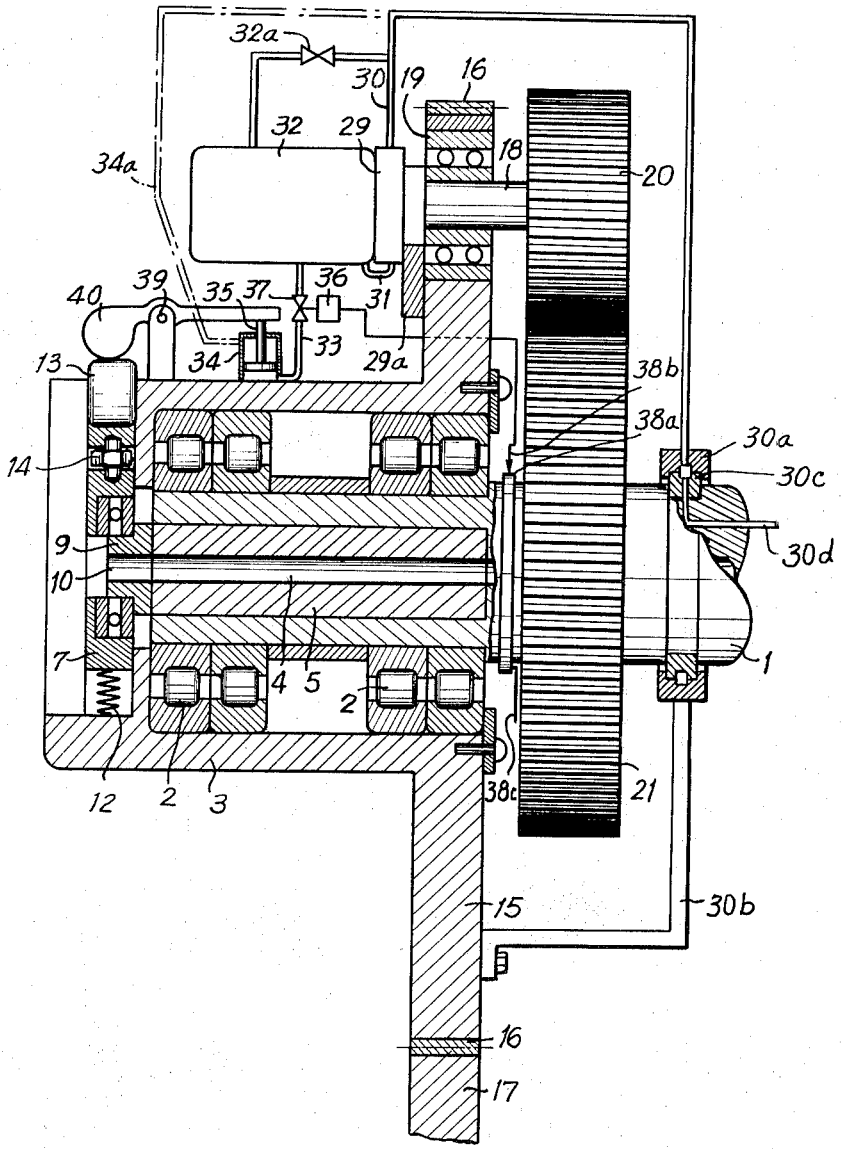

ROTARY SHEARING MACHINE

BACKGROUND OF THE INVENTION

The present invention relates to shearing machines.

In particular, the present invention relates to shearing machines which are designed to shear across elongated workpieces such as bars, rods, and the like, made of any materials although the machine of the invention is particularly designed for shearing steel workpieces.

Conventionally shearing machines include upper and lower shearing components which are moved one with respect to the other in a vertical plane toward each other to shear across a workpiece located between the shearing components. Conventional machines of this type have several drawbacks. Thus, such machines will inevitably deform the work and create excessively large residual stresses in the area where the shearing of the work takes place. Thus, conventional machines stress the work excessively and provide workpieces which are undesirably curved or bent at the region where they have been sheared.

SUMMARY OF THE INVENTION

It is a primary object of the present invention to provide shearing machines which will avoid the above drawbacks.

In particular, it is an object of the present invention to provide shearing machines which are capable of shearing a workpiece with a shearing force which is reduced as compared to shearing forces encountered with conventional machines so as to minimize the residual stress and so as to produce in the sheared work no appreciable curving or bending at the area where the material has been sheared.

In addition it is an object of the present invention to provide a shearing machine which can accomplish these objects while at the same time being simple and rugged and convenient to control to provide the desired shearing action.

According to the invention the shearing machine includes a stationary shearing means formed with an opening to receive part of the work during the shearing thereof, this opening extending along a given axis with the stationary shearing means having at one end a stationary shearing edge which surrounds the latter axis. A rotary shearing means is located next to this latter one end of the stationary shearing means and is also formed with an opening for receiving part of the work during the shearing thereof, this opening of the rotary shearing means having an axis which substantially coincides with the above given axis when the rotary shearing means is in a rest position. The rotary shearing means has next to the one end of the stationary shearing means a rotary shearing edge which surrounds the above given axis when the rotary shearing means is in its rest position. A means is operatively connected with the rotary shearing means for rotating the latter about the above given axis while simultaneously displacing the rotary shearing means transversely with respect to the latter given axis so that the eccentricity of the rotary shearing means with respect to the stationary shearing means increases during a shearing operation and the stationary and rotary shearing edges cooperate to shear a workpiece.

BRIEF DESCRIPTION OF DRAWINGS

The invention is illustrated by way of example in the accompanying drawings which form part of this application and in which:

FIG. 1 is a partly schematic and partly sectional end view of one embodiment of a shearing machine of the invention;

FIG. 2 is a partly sectional longitudinal elevation of the machine of FIG. 1 taken along line 2—2 of FIG. 1 in the direction of the arrows;

FIG. 3 is a fragmentary view of part of a ring means of FIGS. 1 and 2, taken along line 3—3 of FIG. 2 in the direction of the arrows;

FIG. 4 is a longitudinal section of the structure of FIG. 3 taken along line 4—4 of FIG. 3 in the direction of the arrows;

FIG. 5 is a fragmentary schematic end view of another embodiment of a machine according to the invention;

FIG. 6 is a longitudinal sectional elevation of the machine of FIG. 5;

FIG. 9 is a schematic longitudinal sectional elevation of yet another embodiment of a machine according to the invention.

DESCRIPTION OF PREFERRED EMBODIMENTS

Figure 7:
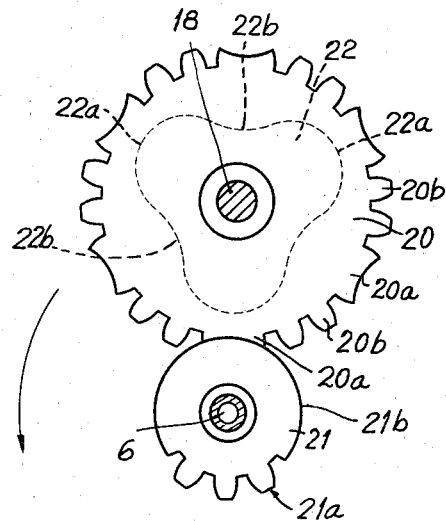
FIG. 7 is a schematic partly sectional end elevation of another embodiment of a machine similar to that of FIGS. 5 and 6.

In accordance with the present invention the shearing machine includes two separate shearing tools or shearing means, one of which can be rotated relative to the other around the material to be sheared. Referring first to FIG. 2, there is illustrated therein a stationary support means 51 which includes an elongated stationary shaft portion 52 which is integral with and forms part of the support means 51. The shaft 52 is formed with an elongated bore 53 extending axially therethrough for receiving the work in the form of elongated work pieces such as bars, rods, or the like, which can be introduced from the right and advanced toward the left, as viewed in FIG. 2.

The left end of the shaft portion 52 of the support means 51, as viewed in FIG. 2, is formed with an enlargement of the opening 53 in order to receive the stationary shearing means 55 which is fixed to and carried by the stationary support means 51 in any suitable way. The stationary shearing means 55 is in the form of a stationary or fixed shearing tool formed with an elongated opening 54 which has an axis coinciding with the axis of the bore 53, and of course the work is received in the opening 54. At its left end, as viewed in FIG. 2, the stationary shearing means 55 has a stationary shearing edge which surrounds the axis of the opening or bore 54. The opening or bore 53 of the shaft 52 has such a size that its diameter is never smaller than the diameter of the opening 54 of the stationary shearing means 55.

At the left of the shaft 52 of the stationary support means is a rotary support means 56 which includes just to the left of the shaft 52 a disc portion 56a, clearly visible in FIG. 1, and surrounding the shaft 52 a cylindrical extension 56b which is integral with the disc portion 56a of the rotary support means 56. Thus, the disc portion 56a is situated in a plane extending perpendicularly across the axis of the opening 54 at the region of the left free end of the shaft 52, while the cylindrical portion 56b coaxially surrounds the shaft 52. Suitable roller bearings 57 and 58 are carried by the shaft 52 of the stationary support means and are surrounded by the cylindrical portion 56b of the rotary support means 56 so that through this expedient the rotary support means 56 is supported by the stationary support means 51 for rotation about the common axis of the openings 53 and 54. A retainer ring 59 is fixed to the right end surface of the rotary support means 56, as by suitable screws 60, and this retainer ring retains the parts assembled in the manner illustrated most clearly in FIG. 2.

The disc 56a of the rotary support means 56 is formed through part of its thickness with an elongated transversely extending notch 56c the configuration of which is most clearly apparent in FIG. 1. Thus this notch has an inner relatively wide region extending across and being considerably larger than the area of the left end of the stationary shearing means 55, while the notch 56c has an outer relatively narrow elongated end region 56d which extends all the way to the outer periphery of the disc portion 56a of the rotary support means 56. As is apparent from FIG. 2, the notch 56c does not extend completely through the disc portion 56a. Thus it will be seen that the disc portion 56a includes an inner transversely extending wall portion 56e which extends across the bearing 57 and overlaps part of the left end of the shaft 52, thus leaving at the inner wall region 56e of the disc 56a an opening which surrounds and is considerably larger than the left end of the stationary shearing means 55.

Situated in the notch 56c is an elongated slide means 61 guided by the surfaces which define the notch 56c for movement transversely of the axis of the opening 54. Thus, the slide means 61 is in the form of a plate having substantially the same configuration as the notch 56c while being shorter than the latter, and this plate has an outer narrow end region 61a which extends into the narrow portion 56d of the slot 56c. Suitable L-brackets 61b are fixed to the disc portion 56a at the surfaces of the notch 56c thereof to overlap the surface of the slide means 61 which is visible in FIG. 1 so as to retain the latter axially against the inner wall region 56e to slide along the later transversely with respect to the axis of the openinng 54. Thus, the slide means 61 is carried by the rotary support means 56 for movement transversely of the axis of the opening 54 along a diameter of the rotary support means 56.

The slide means 61 is formed with an opening 62 adapted to receive part of the work which is to be sheared, and in this opening 62 the slide means 61 carries a rotary shearing means 63 which is formed with an opening 65 forming an extension of the openings 54 and 62 and in a position of rest of the rotary shearing means 63 the opening 65 thereof has an axis coninciding with the axis of the opening 54. As will be apparent from the description which follows the stationary shearing means 55 has next to the rotary shearing means 63 a stationary shearing edge which surrounds the common axis of the stationary and rotary shearing means while the rotary shearing means 63 has next to the stationary shearing means 55 a rotary shearing edge which also surrounds this common axis in the rest position of the parts shown in FIGS. 1 and 2. It will be noted that the diameters of the openings 54 and 65 are equal. Also it will be seen that the rotary shearing means 63 is supported on the slide means 61 by way of a thrust bearing 64 which is carried by the slide means 61 and which supports the rotary shearing means 63 in such a way that it can rotate with respect to the slide means 61 while being compelled to move therewith.

A spring means 66, in the form of a suitable compression spring, is carried by the support means 56 and engages the inner wider end of the slide means 61 to urge the outer relatively narrow end region 61a thereof outwardly to the position shown in FIGS. 1 and 2. It will be seen that the rest position of the rotary shearing means 63 is thus determined by the engagement of the outer wider part of the slide means 61 with the notch 56c at the junction between the wide and narrow parts of the latter. The outer end region 61a of the slide means 61 has a pair of outwardly extending support arms carrying a pin which extends parallel to the axis of the support means 51, and this pin supports for free rotary movement a roller bearing 67 which extends in part between the arms which carry the pin and outwardly beyond the latter and of course outwardly beyond the rotary support means 56 in the rest position of the parts shown in FIGS. 1 and 2.

Surrounding the rotary support means 56 at the portion thereof which carries the slide means 61 is a ring means 68 which has an inner surface region against which the roller bearing 67 is pressed by the spring 66, and as will be apparent from the description which follows the ring means 68 is capable of having the diameter of its inner surface region reduced so as to urge the slide means 61 in opposition to the spring means 66 transversely of the axis of the opening 54. When the slide means 61 is in its rest position the periphery of the roller bearing 67 engages the inner surface of the ring means 68.

As is apparent from FIGS. 3 and 4 as well as FIG. 1 the ring means 68 is composed of three arcuate sections 68a, 68b, and 68c. Suitable hydraulic units 70 are respectively operatively connected with the sections 68a, 68b, and 68c for simultaneously displacing them radially toward and away from the axis around which the rotary support means 56 rotates.

As is apparent from FIGS. 3 and 4, each of the arcuate sections 68a, 68b, and 68c has at one end an elongated extension 72 which is slidable in an elongated groove 74 of the next section. Thus, during movement of the sections 68a, 68b, and 68c of the ring means 68 inwardly toward the axis of the rotary support means 56 the extensions 72 and the grooves 74 will overlap each other to an increasing extent while the diameter of the inner surface region of the ring means 68 reduces, and of course the result will be that the slide means 61 will be displaced transversely of the axis of the opening 54 in opposition to the spring means 66.

Thus it will be seen that the rotary support means 56 together with the slide means 61 and the ring means 68 form a means operatively connected with the rotary shearing means 63 for rotating the latter with respect to the stationary shearing means 55 while at the same time displacing the rotary shearing means 63 transversely of the axis of the opening 54 to increase the eccentricity of the rotary shearing means 63 with respect to the stationary shearing means 55 during a shearing operation.

When the parts are in the illustrated rest position, shown in FIGS. 1 and 2, a rod, bar, or the like, such as, for example, a steel bar, is introduced through the opening 53 of the support means 51 to extend along the opening 54 and on through the opening 65 out through and beyond the opening 62. With the work piece thus positioned in the machine, the rotary support means 56 is rotated and pressure is simultaneously applied to the several hydraulic units 70 through any suitable controls so that the sections of the ring means 68 will be gradually displaced inwardly toward the axis of the opening 54. The rotary support means 56 can be driven in any suitable way. For example the outer surface of the cylindrical extension 56b thereof may carry a ring gear which is driven through a meshing gear driven by any suitable drive. Thus, as the inner diameter of the ring means 68 becomes smaller the roller bearing 67 is displaced together with the remainder of the slide means 61 transversely of the axis of the opening 54 with the outer relatively narrow end region 61a of the slide means approaching this axis. As a result the stationary shearing edge of the stationary shearing means 55, at the part of this shearing edge which is most distant from the outer and narrow end 61a of the slide means 61, this being the lower region of the stationary shearing edge as viewed in FIG. 2, will together with the part of the rotary shearing edge which is nearest to the narrow region 61a of the slide means 61 cooperate to shear the work material. During rotation of the rotary support means 56 a circumferential shearing action takes place while the eccentricity of the rotary shearing means 63 with respect to the stationary shearing means 55 gradually increases. During a complete revolution of the rotary shearing means 63 the relative rotation thereof with respect to the stationary shearing means 55 will form a circumferential shearing cut completely surrounding and extending circumferentially all around the work material along the desired shearing line with the work piece being transversely sheared in this way along this circumferential line. With the above-described structure it is possible to maintain the force of the ring means 68 on the slide means 61 and thus on the rotary shearing means 63 substantially constant while the rotary support means 56 continues to rotate together with the slide means 61 and rotary shearing means. When a shearing operation has been completed the hydraulic units 70 are actuated through suitable controls so as to retract the sections of the ring means 68 back to their initial outer positions, and of course the spring means 66 will now expand so as to return the parts to the rest position shown in the drawings. In this way the machine is placed in a condition ready for the next shearing operation.

Thus, with the above-described structure the rotary shearing means is shifted so as to have an increasing eccentricity with respect to the stationary shearing means so that when the work piece is inserted into the coaxial openings of the rotary and stationary shearing means when the machine is in its rest position it is only necessary to simultaneously rotate the rotary shearing means and increase the eccentricity thereof to achieve a shearing force which is circumferentially applied to the work piece so as to shear the latter with a reduced force, as compared to the shearing force applied with conventional shearing machines, without any danger that there will be any appreciable bending or curving of the work at the location of the shear and at the same time without requiring any large residual stresses to remain in the work at the area where the shearing operation takes place.

FIGS. 5 and 6 illustrate a further embodiment of the invention. As is apparent from FIG. 6 the stationary support means of this embodiment includes an elongated fixed shaft 1 carrying a series of roller bearings 2 which support the rotary support means 3 for rotation about the common axis of the stationary support means 1 and the rotary support means 3. The stationary support means 1 is formed with an axial bore 6 and carries at its left end region, as viewed in FIG. 2, the stationary shearing means 5 which is formed with the opening or bore 4 which forms an extension of the opening 6, this shearing means 5 of course having at its left end, as viewed in FIG. 6, the stationary shearing edge which surrounds the axis of the opening 4. The rotary support means 3 carries the slide means 7 in the manner described above in connection with FIGS. 1 and 2, so that the slide means 7 is slidable along a diameter of the rotary support means 3. The slide means 7 carries in the same way as the slide means 61 a thrust bearing 8 which serves to support on the slide means 7 the rotary shearing means 9 cooperating with the stationary shearing means 5 in the manner described above in connection with the rotary and stationary shearing means of FIGS. 1 and 2. Thus the rotary shearing means 9 has an opening 10 which in the rest position of the parts has an axis coinciding with the axis of the opening 4. These openings 4 and 10 have the same diameter. Thus the right end of the rotary shearing means 9 has a rotary shearing edge which surrounds the axis of the opening 10. The rotary support means 3 is formed with the notch 11 which is substantially identical with the notch 56c described above, and the slide means 7 is mounted in this notch 11. Also it will be seen that the rotary support means 3 carries the spring means 12 which corresponds to the spring means 66 and acts in the same way to urge the slide means 7 in a direction according to which the outer free end region thereof, which carries a roller 13 in the illustrated embodiment, will be situated outwardly beyond the outer periphery of the rotary support means 3. The roller 13 has an axis which is parallel to the axis of the rotary support means 3, and this roller 13 directly presses against the outer end of the slide means 7, any suitable lubricant being provided at the outer surface of the roller 13 and the surface at the outer end of the slide means 7 along which the roller 13 turns. It will be noted that this outer end surface of the slide means 7 is suitably curved to conform to the curvature of the roller 13. In the illustrated example the outer elongated narrower region of the slide means 7 is formed of a pair of components interconnected by a rotary adjusting screw 14 having a bore provided with oppositely threaded regions receiving oppositely threaded studs which are threaded into bores of the regions of the slide means 7 located on opposite sides of the nut 14 so that upon turning of the latter the length of the slide means 7 can be altered at its outer end region and thus the position of the roller 13 with respect to the rotary shearing means 9 can be changed. In this way the extent to which the roller 13 projects outwardly beyond the outer periphery of the rotary support means 3 can be adjusted.

The rotary support means 3 fixedly carries a gear portion 15 which forms part of a drive means for the rotary support means 3, and the teeth 16 of the gear portion 15 mesh with a drive gear or pinion 17 driven in any suitable way, so that in this way the rotary support means 3 is driven. Of course the rotary support means 56 can be driven in the same way.

The flange of the rotary support means 3 which forms the gear 15 is formed with an opening in which a ball bearing 19 is housed, and this bearing 19 serves to support a shaft 18 for free rotary movement with respect to the gear 15 while at the same time being compelled to rotate together with the gear 15 and the rotary support means 3 about the axis of the latter. Thus the axis of the rotary shaft 18 is perpendicular to the plane in which the slide means 7 slides transversely of the axis of the opening 4. The displacing means for displacing the slide means 7 in the embodiment of FIGS. 5 and 6 includes a cam 22 which is fixed to the shaft 18 and which has a single projecting lobe shown at the upper region of the cam 22 in FIG. 5. Thus when the lobe 22b engages the roller 13 the rotary shearing means 9 will be eccentrically displaced with respect to the stationary shearing means 5. When the portion 22a of the cam 22 engages the roller 13, however, as illustrated in FIGS. 5 and 6, the parts are in their rest position.

The end of the shaft 18 which is distant from the cam 22 of the displacing means fixedly carries a gear 20 which meshes with a stationary gear 21 fixedly carried by the stationary support means 1. Thus the gears 20 and 21 form a transmission means which responds to the rotation of the rotary support means 3 in order to rotate the cam 22 and thus actuate the displacing means to displace the slide means 7 transversely of the axis of the opening 4 during rotation of the rotary means 3. In the particular example illustrated the gear 20 has twice the number of teeth as the stationary gear 21 so that during one revolution of the rotary support means 3 with respect to the stationary support means 1 the gear 20 will make only one half a revolution with respect to the complete revolution of the rotary support means 3. The arrangement is such that the cam 22 will be displaced through 180° during the half revolution of the shaft 18 which takes place during a single full revolution of the rotary support means 3. In this way during one revolution of the rotary support means 3 the maximum eccentricity of the rotary shearing means 9 will be reached and during the next revolution of the rotary support means 3 the rotary shearing means 9 will be returned by the spring 12 to its initial rest position, so that a complete shearing operation takes places at every two revolutions of the rotary support means 3 with the illustrated embodiment. Thus during substantially the entire second half revolution of the shaft 18 and the cam means 22 the rotary shearing means 9 remains at its rest position.

It is apparent that the above-described structure of FIGS. 5 and 6 will achieve the same results as the above-described structure of FIGS. 1–4.

FIG. 7 illustrates an embodiment of the invention which differs from that of FIGS. 5 and 6 only with respect to the structure of the gears 20 and 21 and the configuration of the cam 22. As may be seen from FIG. 7, the gear 20 which rotates together with the support means 3 has in this embodiment six relatively wide arcuate portions 20a which are adapted to slide around the gear 21 on the smoothly curved circular surface portion 21b thereof illustrated in FIG. 7. These equally spaced portions 20a of the gear 20 alternate with the toothed portions 20b each of which is made up of two teeth, so that between each pair of successive portions 20a there are a pair of teeth 20b. The gear 21 has in addition to its smoothly curved portion 21b teeth 21a which form from the gear 21 of FIG. 7 a partial gear.

The shaft 18 of FIG. 7 carries a cam 22 which has a plurality of lobes 22a. In the illustrated example there are three lobes 22a equidistantly spaced from each other by 120° and alternating with the concave portions 22b situated between the lobes 22a. It will be noted that the three lobes 22a are respectively aligned with three of the portions 20a of the gear 20 which are spaced from each other by 120° while the alternating concave portions 22b are respectively aligned with the remaining three portions 20a which are also spaced from each other by 120°. Therefore, during one revolution of the rotary support means 3 when the gear 20 turns one complete revolution around the gear 21, the cam 22 of FIG. 7 will rotate through 60° advancing from a position where a lobe 22a engages the roller 13 of the slide means 7 to a position where a portion 22b engages the roller 13, and then during the next revolution another lobe 22a will engage the roller 13. Thus, during the successive revolutions a lobe of the cam and a recessed portion thereof are respectively brought into engagement with the roller 13. The parts are in the rest position when the roller 13 engages a recessed portion 22b of the cam 22. In this position the work material is introduced through the aligned openings of the stationary and rotary shearing means, and then during the next revolution a shearing operation takes place while during the following revolution the parts return to their rest position, the sheared work is removed and another work piece is placed in the machine. During these operations the work to be sheared can be fixedly clamped by a suitable clamp which is not illustrated and which may be carried by the stationary support means 1. As was pointed out above, this embodiment will operate in the same way as the embodiment of FIGS. 1 and 2 providing a circumferential shearing action as the eccentricity of the rotary shearing means 9 increases with the shearing action taking place around the entire circumference of the work. Thus the work is sheared easily and with a considerably reduced force as compared with conventional shearing machines. Thus, with the machine of FIG. 7 during one revolution the sheared work can be removed and the new work can be introduced while during the next revolution the shearing action takes place.

Figure 8:
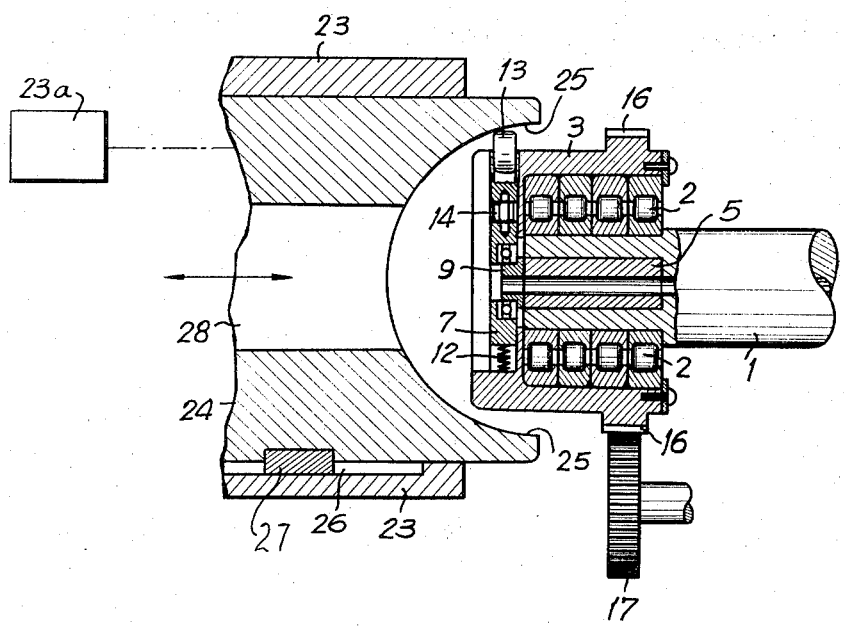
FIG. 8 is a longitudinal sectional elevation showing fragmentarily and in part schematically a further embodiment of a machine according to the invention.

With the embodiment which is illustrated in FIG. 8, the structure is the same as that of FIGS. 5 and 6 except that the structure for advancing the slide means is different. According to the embodiment of FIG. 8 the roller 13 is engaged by an interior camming surface 25 of a hollow cam 24 supported by a support means 23 for axial movement. The axial movement is brought about in any suitable way such as by a hydraulic unit 23a. Thus the unit 23a acts on the cam 24 to shift the latter along the axis of the stationary shearing means 5. The hollow interior camming surface 25 tapers as illustrated and in the illustrated example forms part of a sphere although of course this surface may also form part of a cone if desired. Thus, as the rotary support means 3 is rotated through the drive 16, 17 the cam 24 is advanced toward the right so that a continuously smaller diameter portion of the surface 25 engages the roller 13 to advance the slide means 7 continuously, increasing the eccentricity of the rotary cam means 9. This action takes place as the cam 24 is shifted toward the right, as viewed in FIG. 8. The stationary support means 23 is formed with a groove 26 receiving a key 27 which is fixed to the cam 24 so that the latter cannot rotate with respect to the stationary support means 23. In addition the cam 24 is formed with an opening 28 through which the work can move.

Referring now to FIG. 9, in this embodiment the slide means 7 is displaced by a displacing means which includes a fluid-pressure means for actuating a displacing lever. Thus in the example of FIG. 9 a hydraulic means is relied upon to provide the force for shifting the slide means 7 transversely of the axis of the opening 4 of the stationary shearing means 5. Referring to FIG. 9 it will be seen that the rotary gear portion 15 of the rotary support means 3 through a suitable fixing bracket 29a or the like carries a pump 29 such as a vane pump, this pump 29 thus rotating together with the gear 15 and the support means 3. The rotary shaft 18 is driven in response to rotation of the rotary support means 3 through the cooperation of the gears 20 and 21 as described above in connection with FIG. 6. Thus, whenever the rotary support means 3 turns, then in response to the rotary movement thereof the pump 29 will be driven. Hydraulic fluid is fed to the suction inlet of the pump 29 from any suitable reservoir through an inlet pipe 30 which communicates with an internal groove of a rotary ring 30a which is fixed by brackets 30b or the like to the gear 15 for rotary movement therewith. This rotary ring 30a slidably and fluid-tightly engages a stationary ring 30c which is formed with a groove aligned with the groove of the rotary ring 30a. The shaft 1 is formed with a bore communicating with the internal grooves of the stationary and rotary rings 30c and 30a, respectively, and the bore 30d in the shaft 1 communicates with the reservoir of oil. This connection of inlet 30 of the pump 29 to the reservoir may also be provided at a location where the rotary surface of the support means 3 engages a stationary surface of the support means 1.

The pressure outlet of the pump 29 communicates through the discharge pipe 31 with a tank 32 fixed to and rotating with the pump 29 although the tank 32 could also be mounted on any suitable support fixedly carried by the rotary support means 3. Thus the tank 32 may be fixed to any part of the support means 3 for rotation with the latter. In this way the tank 32 contains a supply of oil under pressure. This oil under pressure in the tank 32 communicates through a conduit 33 with a cylinder 34 fixedly carried by the rotary support means 3 as schematically illustrated. Thus the oil under pressure can be delivered to the inner end of the cylinder 34 which is nearest to the axis of the rotary support means 3. As is shown in dot-dash lines, the outer end region of the cylinder 34 communicates through a suitable outlet pipe 34a with the inlet 30 and through the latter with the reservoir for the oil.

The flow of oil through the pipe 33 is controlled by a valve 37 which is opened and closed by an electromagnet 36. Thus the unit 36, 37 forms a solenoid valve. The electromagnet 36 is controlled by conductors which are electrically connected with a slide member 38b which slides around a stationary electrically conductive ring 38a carried by and insulated from the shaft 1, this conductive ring 38a in turn being connected with any suitable source of current through conductors 38c. These conductors 38c are connected through suitable controls to a source of power so that the controls may be manipulated in order to control the energizing and deenergizing of the solenoid valve 36, 37, thus opening and closing communication between the cylinder 34 and the tank 32.

The piston within the cylinder 34 has a piston rod or ram 35 which extends upwardly beyond the cylinder 34 and engages the right end of a lever 40 supported for pivotal movement on a pin 39 carried by suitable arms which are fixed to the rotary support means 3 as illustrated. The left end of the lever 40, as viewed in FIG. 9, is curved as illustrated and engages directly the roller 13 which is urged toward the lever 40 and maintained in engagement therewith by the spring means 12.

Thus, when the controls provided through the conductors 38c actuate the solenoid valve 36, 37 to supply oil under pressure to the ram 35 so as to raise the latter, the lever 40 is turned in a counterclockwise direction about the pin 39, as viewed in FIG. 9, thus displacing the slide means 7 and bringing about the shearing action by increasing the eccentricity of the rotary shearing cam as described above. Of course, before these operations take place the work has been introduced through the openings 4 and 10 which are aligned in the rest position of the parts shown in FIG. 9. It is to be noted that with the embodiment of FIG. 9 the number of teeth of the gear 20 is much smaller than the number of teeth of the gear 21, in contrast to the arrangement shown in FIG. 6 and described above where the gear 20 has twice the number of teeth of the gear 21. With the embodiment of FIG. 9 the gear 20 has a far smaller number of teeth than the gear 21 so that the gear 20 will be rotated rapidly through several revolutions during each revolution of the rotary support means 3 to bring about in this way an effective operation of the pump 29. In this way the pump 29 is operated effectively to achieve the required high pressure.

In addition a safety valve 32a is connected between the tank 32 and the inlet conduit 30, this safety valve 32a automatically opening in a known way if the pressure in the tank 32 builds beyond a desired level. When the solenoid valve 36, 37 closes at the end of a shearing operation, the spring 12 slowly expands displacing the piston in the cylinder 34 inwardly toward the axis of the opening 4 while the oil in the cylinder 34 slowly flows from the inner side to the outer side of the piston, this flow taking place at the film of oil between the outer periphery of the piston and the inner surface of the cylinder, so that in this way the parts return to their initial position upon closing of the valve 36, 37.

It is apparent, therefore, that with the embodiment of FIG. 9 the rotary shearing machine of the invention provides also the rotation of a rotary shearing means while gradually increasing the eccentricity thereof with respect to the stationary shearing means so that the shifting of the rotary shearing means with respect to the axis of the stationary shearing means brings about the circumferential shearing action. Either a cam means or the hydraulic means of FIG. 9 can be used for this purpose. The shearing force changes in an extremely smooth and continuous manner with the machine of the invention so that the machine of the invention will not produce a curve or bent portion in the work and there will be no undesirable residual strain in the work material at the area where the shearing thereof takes place.

What is claimed is:

1. In a machine for shearing elongated workpieces such as bars, rods, or the like, stationary shearing means formed with an opening for receiving part of workpiece during shearing thereof, said opening extending along a given axis and said stationary shearing means having at one end a stationary shearing edge surrounding said axis, rotary shearing means located next to said one end of said stationary shearing means and formed with an opening for also receiving part of a workpiece during shearing thereof, said rotary shearing means having a rest position where said given axis extends substantially centrally through said opening of said rotary shearing means and said rotary shearing means having next to said one end of said stationary shearing means a rotary shearing edge which surrounds said axis in said rest position of said rotary shearing means, and means operatively connected with said rotary shearing means for rotating the latter around said given axis while simultaneously displacing said rotary shearing means transversely with respect to said given axis for increasing the eccentricity of said rotary shearing means with respect to said stationary shearing means while shearing a workpiece with said stationary and rotary shearing edges.

2. The combination of claim 1 and wherein said means for rotating and displacing said rotary shearing means includes a slide means which carries said rotary shearing means, a rotary support means operatively connected with said slide means for supporting the latter together with said rotary shearing means for rotation about said given axis and for movement with respect to said rotary support means transversely of said axis, displacing means engaging said slide means for displacing the latter transversely of said axis, and drive means operatively connected with said rotary support means for rotating the latter about said axis.

3. The combination of claim 2 and wherein a stationary support means carries said stationary shearing means and supports said rotary support means for rotation about said axis.

4. The combination of claim 2 and wherein said slide means has an outer free end region normally extending outwardly beyond a portion of said rotary support means and said displacing means engaging said outer free end region of said slide means for displacing the latter transversely of said axis.

5. The combination of claim 4 and wherein a spring means is carried by said rotary support means and engages said slide means for urging said free end region thereof toward said displacing means.

6. The combination of claim 5 and wherein said displacing means includes a ring means surrounding said rotary support means and having an inner annular surface region engaging said outer free end region of said slide means, and means operatively connected with said ring means for gradually reducing the diameter of said inner surface region thereof for displacing said slide means transversely of said axis.

7. The combination of claim 5 and wherein said displacing means includes a cam means engaging said outer free end region of said slide means for displacing the latter transversely with respect to said given axis.

8. The combination of claim 7 and wherein said cam means is carried by said rotary support means for rotation therewith and transmission means operatively connected with said cam means for responding to rotation of said rotary support means for turning said cam means to displace said slide means with respect to said rotary support means.

9. The combination of claim 8 and wherein said cam means has a single camming lobe for displacing said slide means.

10. The combination of claim 8 and wherein said cam means has a plurality of camming lobes each of which displaces said slide means during a shearing operation, and said transmission means being operatively connected with said cam means for turning the latter during each shearing operation through an angle sufficient to complete a shearing operation with each shearing lobe.

11. The combination of claim 7 and wherein said cam means is hollow and has an inner camming surface surrounding said given axis and engaging said outer free end region of said slide means, and said camming surface tapering with respect to said given axis, and means operatively connected with said cam means for displacing the latter along said axis to place in engagement with said outer free end region of said slide means portions of said camming surface which are of a gradually smaller diameter.

12. The combination of claim 11 and wherein said camming surface forms part of a sphere.

13. The combination of claim 2 and wherein said displacing means includes a lever means carried by said rotary support means for rotation therewith and engaging said outer free end region of said slide means for displacing the latter transversely with respect to said given axis during turning of said lever means, and fluid-pressure means also carried by said support means for rotary movement therewith and operatively connected with said lever means for turning the latter to displace said slide means.

14. The combination of claim 13 and wherein said fluid-pressure is a hydraulic means.

15. The combination of claim 14 and wherein said hydraulic means includes a pump carried by said rotary support means for rotation therewith and a transmission means operatively connected with said pump for driving the latter in response to rotation of said rotary support means.

* * * * *

UNITED STATES PATENT OFFICE
CERTIFICATE OF CORRECTION

PATENT NO. : 3,863,535
DATED : February 4, 1975
INVENTOR(S) : Masaji Hamano

It is certified that error appears in the above-identified patent and that said Letters Patent are hereby corrected as shown below:

In the heading, change the name of the inventor from "Masai Hamano" to -- Masaji Hamano --.

Signed and sealed this 24th day of June 1975.

(SEAL)
Attest:

RUTH C. MASON
Attesting Officer

C. MARSHALL DANN
Commissioner of Patents
and Trademarks